Figure 1:
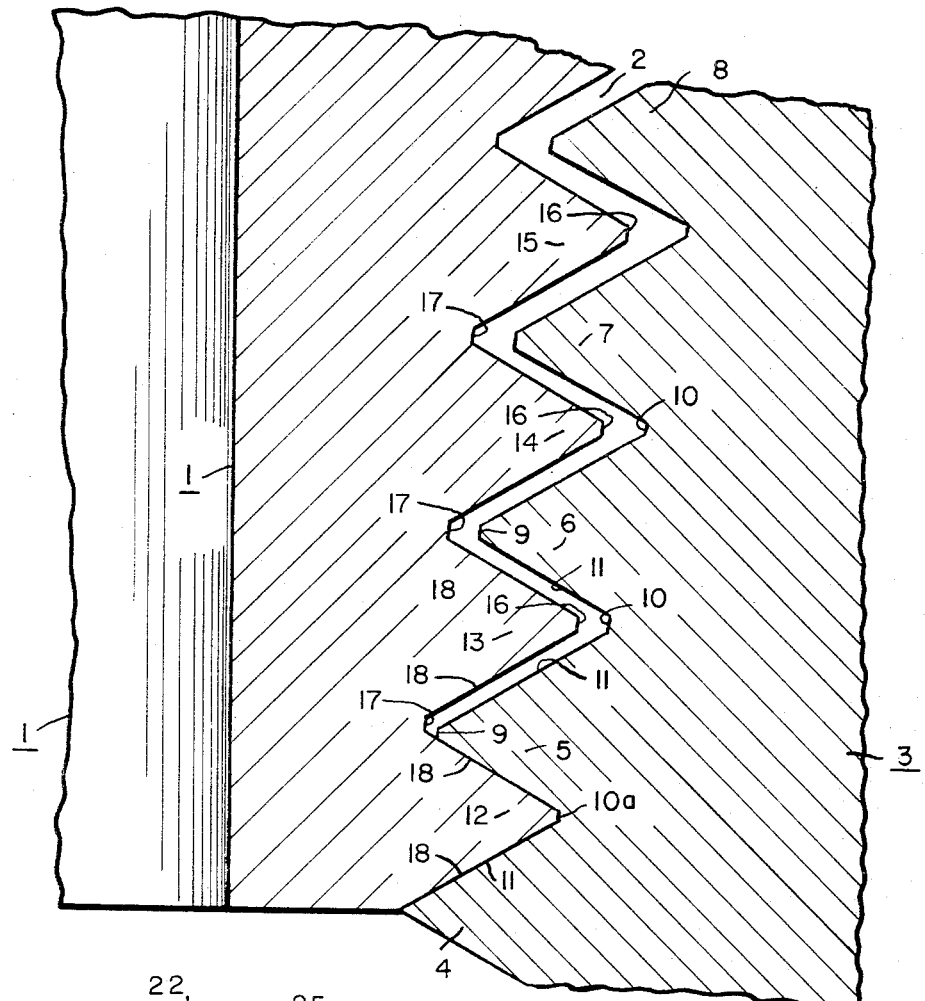

Oct. 10, 1967  W. C. YOCUM  3,346,278

TAPERED PIPE THREAD

Filed April 5, 1965  2 Sheets-Sheet 1

INVENTOR.
William C. Yocum

BY Webb, Burden,
Robinson + Webb

HIS ATTORNEYS

INVENTOR.
William C. Yocum
BY Webb, Burden,
Robinson + Webb
HIS ATTORNEYS

United States Patent Office 3,346,278
Patented Oct. 10, 1967

3,346,278
TAPERED PIPE THREAD
William C. Yocum, Mount Lebanon, Pa., assignor to Superior Valve & Fittings Company, Pittsburgh, Pa.
Filed Apr. 5, 1965, Ser. No. 445,675
1 Claim. (Cl. 285—333)

This invention relates to tapered V-threads and particularly to tapered threads which form a seal against flow of a fluid under pressure and which, for example, are used for flow control valves screwed into cylinders containing gases such as oxygen, hydrogen, nitrogen, helium and other gases. These gases are stored in the cylinders under pressures of about 100–10,000 p.s.i. In many cases a luting compound which fills some irregular voids in and between the threads is added to same for assistance in effecting the seal.

In tapered threads the amount of taper is commonly referred to as a mean taper and is expressed in inches per foot. For example, a mean taper of ¾" per foot is a thread which, if extended for one foot in length, would be ¾" inch greater in diameter at one end than at the other end of the foot-long threads.

Heretofore, both the internal or female threads which are on the cylinder and the external or male threads which are on the valve, have had the same taper and substantially the same tolerances in taper. Under such circumstances when the external threads had a minimum tolerance and the internal threads had a maximum tolerance, the lower or bottom threads of the valve are sealed down inside the threads of the cylinder. However, if the tolerances were reversed, i.e., the external threads had a maximum tolerance and the internal threads had a minimum tolerance, then the seal and contact of external and internal threads is between the upper threads of the cylinder and one or more of the intermediate threads of the valve.

This latter condition generates problems particularly when a brass valve is mounted upon a steel cylinder for the brass is softer than steel whereby the brass threads are crushed and deformed upon tightening of the valve upon the cylinder. Application of torque to the valve for attaching it to the cylinder causes the intermediate external threads of the valve to be crushed upon the upper internal threads of the steel cylinder to such an extent that they become too large to enter the threaded opening of the cylinder and thereby encounter shearing. Thus, imperfect threads are formed and engage the cylinder threads and thereby render achievement of a seal difficult. Also, there is increased friction between the threads which causes a problem in producing the desired seal.

Where the tolerances in taper are substantially the same but such that when the taper on the external threads is maximum and the taper on the internal threads is minimum as in the case of National gas taper threads (NGT), then the taper of both the internal and external threads is exactly the same and a good seal is not easily obtained. Since these cylinders store gases at high pressures up to and over 10,000 p.s.i., an effective seal is essential. Leakage through the attachment of the valve to the cylinder has been a long standing problem.

Tapered threads have truncated-shaped crests and roots with the amount of truncation specified between a minimum and a maximum and determining the amount of flatness on the crests and in the roots of the threads. These roots and crests of the internal and external threads are mating parts and when the internal and external threads have the same crests and roots, the crests of the external threads contact the roots of the internal threads and the crests of the internal threads contact the roots of the external threads. However, if the crests have a maximum truncation, maximum flatness, and the roots have a minimum truncation, minimum flatness, then there is no engagement between roots and crests and an angular spiral passageway is formed to produce a leakage for flow of gas under pressure through the threads. Accordingly, luting compounds are used so that when the valve is screwed into the cylinder the luting compound fills the void to produce a seal. Where, however, the crests have a minimum truncation and the roots a maximum truncation, the crests dig into the roots before the flanks of the threads contact each other. Such condition eliminates the annular spiral passageway formed by the space between the crests and roots.

My invention in tapered V-threads achieves a superior seal with greater unit pressure between the threads particularly between the external threads at the lower end of the valve and mating internal threads of the cylinder accompanied by requirements for application of less torque to effect the seal than previously employed. Furthermore, my invention is such that conventional internal tapered threads need not be altered or revised in any way to enjoy the full advantages of my invention. Specifically, my invention resides in tapered threads having a female member with internal tapered threads and a male member with external tapered threads with the members adapted for threaded engagement with one another. The invention comprises external threads which have a basic taper between substantially about 20% and 80% of a basic taper of the internal threads. The threads of both members have crests and roots of a dimension such that at least one of the crests of the male member always imbeds into an oppositely disposed root of the female member completely around both members. Prior to initial makeup, the thread crest having the smallest diameter on the male member has a diameter greater than the thread root having the smallest diameter on the female member, such that the male crest sealingly contacts the female root prior to contact between adjoining flanks. After a crest of the male imbeds into an oppositely disposed root of the female member completely around the members, the adjacent flanks of the male and female member on both sides of the contact point come into full-flank sealing contact. The crests of the threads of the male member have a maximum truncation which is equal to or less than the minimum truncation of the roots of the female member threads. The minimum truncation of the male member thread crests is substantially between 30% and 100% of the maximum truncation of the male member thread crests, and the roots of the male member threads have a minimum truncation which is either equal to or greater than the maximum truncation of the crests of the female member threads.

Figure 2:
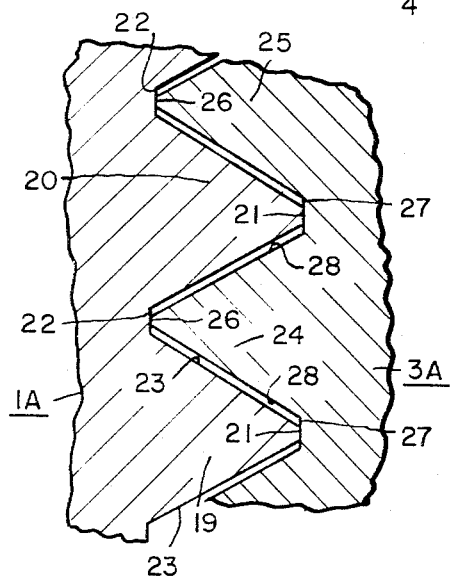
Figure 4:
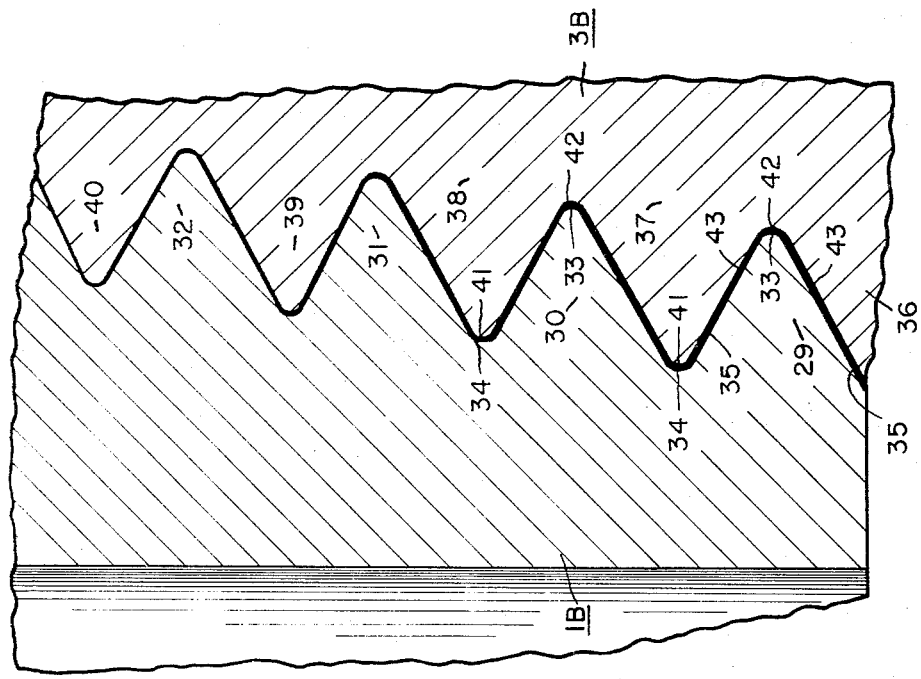
Figure 3:
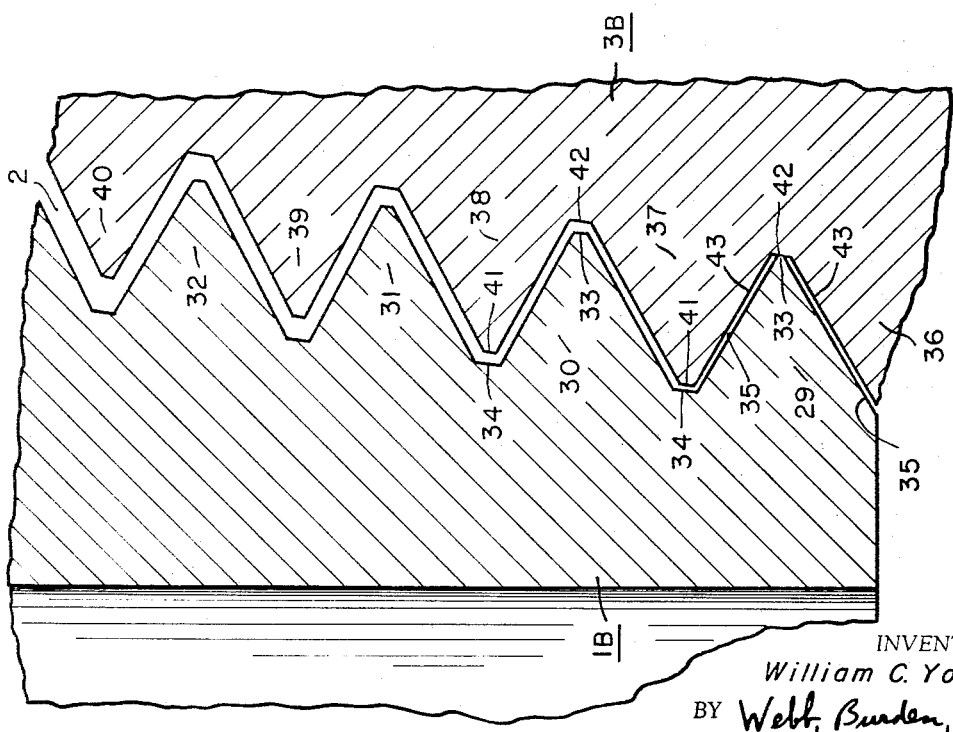

In the accompanying drawings, I have shown preferred embodiments of my invention in which FIGURE 1 is a fragmentary section view of a portion of a cylinder and a portion of a valve threaded into the cylinder with threads of the valve having the taper of my invention; FIGURE 2 is a view similar to FIGURE 1 but with the threads of the valve having the roots and crests of my invention; FIGURE 3 is a view similar to FIGURE 1 wherein the threads of the valve have both the taper and the roots and crests of my invention and wherein the valve is screwed into the cylinder hand tight; and FIGURE 4 is a view similar to FIGURE 3 but showing the threads of the valve and the cylinder screwed together wrench tight.

Referring to FIGURE 1, a flow control valve 1 is screwed into an opening 2 through the wall of a cylinder 3 which contains a gas under pressure. The opening 2 is defined by internal tapered threads 4, 5, 6, 7 and 8 with thread 4 being the innermost. These cylinder threads have a basic taper of ¾" per foot and comprise truncated-shaped crests 9, truncated-shaped roots 10 and flanks 11. For a ¾" size pipe thread the minimum truncation of the crests and roots is 0.0024 inch and the maximum truncation of the crests and roots is 0.0056 inch. Such a thread meets the specifications of American Standard Pipe Threads commonly identified as N.P.T. Threads.

The valve 1 has external tapered threads 12, 13, 14 and 15 with thread 12 being the leading thread and in engagement with the internal threads 4 and 5 of the cylinder and threads 13, 14 and 15 being disposed opposite threads 5, 6, 7 and 8 of the cylinder respectively. These valve threads have a basic taper of ½″ per foot and comprise truncated-shaped crests 16, truncated-shaped roots 17 and flanks 18 which are similar to the corresponding crests, roots and flanks of the cylinder 3. As shown, the flanks 18 of the leading external thread 12 engage the flanks 11 of the internal threads 4 and 5 of the cylinder 3 and the crest of thread 12 has imbedded into the root 10a between the cylinder threads 4 and 5.

The difference in the amount of taper between the valve threads and the cylinder threads provides a clearance between the outer threads when there is engagement between the inner threads as shown in FIGURE 1. Thus, damage or crushing of intermediate or outermost threads of the valve by engagement with the cylinder threads is avoided. This difference in amounts of taper also effects a tighter wedging of the leading valve threads down inside the internal threads of the cylinder than the trailing valve threads to achieve a greater likelihood of a seal between both flanks and the roots and crests. Further tightening of the valve shown produces crushing of the first few threads of the valve but no shearing or excessive crushing of the intermediate and outermost valve threads to render these intermediate and outermost valve threads too large or excessively large for entry into the cylinder.

When the external threads of the valve have a basic taper which is between substantially about 20% and 80% of the basic taper of the internal threads of the cylinder, achievement of the seal between the leading external threads and the innermost internal threads is assured irrespective of whether the external and internal threads are at opposite extreme limits of commercial or recognized taper tolerances. An external thread basic taper more than 80% of the basic taper of the internal threads is insufficient to assure a good seal and avoid the problems heretofore encountered and a basic taper less than 20% of that of the internal threads is too great a difference and encounters new problems. Furthermore, such a basic taper on the external threads relative to the basic taper of the internal threads effects greater wedging between the lower external threads for a given amount of torque applied to the valve and thereby produces greater unit pressure between the threads and a superior seal.

Referring to FIGURE 2, a valve 1A has external tapered threads 19 and 20 with truncated crests 21, truncated roots 22 and flanks 23 and a cylinder 3A has internal tapered threads 24 and 25 with truncated crests 26, truncated roots 27 and flanks 28. As shown, the valve is screwed hand tight into the cylinder 3A. The amount of taper of both the external and internal threads is substantially the same, is conventional and meets the specification of American Standard Pipe Threads and the crests and roots of the cylinder threads are identical with those of the cylinder 1 of FIGURE 1.

The thread crests 21 of the valve threads have a maximum truncation which is equal to or less than the minimum trunaction of the roots 27 of the cylinder threads. The minimum truncation of the thread crests 21 of the valve is substantially between 30% and 100% of the maximum truncation of the thread crests thereof. Additionally, the roots 22 of the valve threads have a minimum truncation which is substantially equal to the maximum truncation of the crests 26 of the cylinder threads. Such crests and roots of the valve threads assure that the first few threads of the valve imbed into the roots of the cylinder threads and that the crests of the internal threads imbed into the roots of the leading valve threads. Accordingly, a good seal is consummated at the area of engagement between the crests and roots of the valve and cylinder threads by virtue of the truncation size of the roots and crests of the valve threads relative to the truncation size of the roots and crests of the cylinder threads.

FIGURE 3 shows a valve 1B screwed hand tight into a cylinder 3B and FIGURE 4 shows the same valve screwed wrench tight into the cylinder 3B. The valve 1B has tapered threads 29, 30, 31, 32 with truncated crests 33, truncated roots 34 and flanks 35. The amount of taper of these valve threads is identical to that of the taper of the valve 1 of FIGURE 1 and the amount of truncation of the roots and crests is identical to that of the valve 1A of FIGURE 2.

The cylinder 3B has tapered threads 36, 37, 38, 39 and 40 with truncated crests 41, truncated roots 42 and flanks 43. The amount of taper of these cylinder threads and the amount of truncation of the roots and threads is identical to those threads of the cylinders 1 and 1A and meets the specification of American Standard Pipe Threads.

As shown in FIGURE 3, at hand tight engagement the crests and roots of the leading valve threads and the inner cylinder threads engage before the flanks of these threads contact. A space is formed between the trailing valve threads and the outer cylinder threads to avoid the shearing or excessive crushing problem described. When the valve 1B has been wrenched tightly into the cylinder 3B, there is engagement between the flanks and roots and rests of the threads of the valve and cylinder with the leading valve threads 29 and 30 and the innermost cylinder threads 36 and 37 being deformed more than the trailing and outer threads of the valve and cylinder. As the valve 1B is wrenched from the hand tight position to the wrench tight position, the flanks of the threads advance into engagement with one another and the crests imbed into the roots. In this wrenching the leading or small diameter threads are deformed or crushed considerably more than valve threads with conventional amounts of taper but this additional deformation in the leading valve threads produces a superior and more positive seal. Also, there is more imbedding of the leading valve thread crests into the cylinder thread roots and more imbedding of the inner cylinder thread crests into the valve thread roots than is the case for conventional valve and cylinder threads. Thus, a superior seal both along the flanks and in the areas of the crests and roots results for a given amount of torque applied to the valve.

Although the crests and roots have been shown as substantially flat, they can be rounded and indeed wear may effect rounded crests and roots.

My invention has important advantages which include realization of a superior seal while using conventional internal threads such as N.P.T. and N.G.T. threads of the cylinders. Accordingly, only the male or external threads need be formed with my prescribed basic taper and with the prescribed truncation for the crests and roots thereof. Additionally, this superior seal is effected with less torque than employed for conventional threads and achieves a tighter wedging between the threads especially along the flanks thereof to assure a seal which can successfully withstand pressures of 10,000 p.s.i. or greater.

While I have shown and described a preferred embodiment of my invention, it may be otherwise embodied within the scope of the appended claim.

I claim:

In tapered V- threads which form a seal against flow of fluid under pressure having a female member with internal tapered threads and a male member with external tapered threads, said members being adapted for threaded engagement with one another, the invention comprising said external tapered threads having a basic taper between substantially about 20% and 80% of a basic taper of said internal tapered threads, and prior to initial makeup the thread crest having the smallest diameter on said male member has a diameter greater than the thread root having the smallest diameter on said female member such that said male crest sealingly contacts said female root prior to contact between adjoining flanks and at least one of said crests of said male member always imbeds into an oppositely disposed root of said female member completely around said members, and thereafter adjacent flanks of the male and female member on both sides of the contact point come into full-flank sealing contact, said thread crests of said male member having a maximum truncation which is no greater than the minimum truncation of said female member thread roots, said minimum truncation of said male member thread crests being substantially between 30% and 100% of said maximum truncation of said male member thread crest, said roots of said male member threads having a minimum truncation which is at least equal to the maximum truncation of said crests of said female member threads.

References Cited
UNITED STATES PATENTS

| | | | |
|---|---|---|---|
| 597,000 | 1/1898 | Higbee | 285—333 |
| 2,062,407 | 12/1936 | Eaton | 285—334 |
| 2,267,923 | 12/1941 | Johnson | 285—334 |

CARL W. TOMLIN, *Primary Examiner.*

D. W. AROLA, *Assistant Examiner.*